United States Patent [19]

Heck et al.

[11] Patent Number: 5,595,423
[45] Date of Patent: Jan. 21, 1997

[54] VEHICLE WHEEL COVER RETENTION SYSTEM AND METHOD FOR PRODUCING SAME

[75] Inventors: Thomas E. Heck, Monroe; Michael V. Maloney, Belleville, both of Mich.

[73] Assignee: Hayes Wheels International, Inc., Romulus, Mich.

[21] Appl. No.: 569,023

[22] Filed: Dec. 7, 1995

Related U.S. Application Data

[63] Continuation-in-part of Ser. No. 389,867, Feb. 23, 1995, which is a continuation-in-part of Ser. No. 203,058, Feb. 28, 1994, Pat. No. 5,435,631.

[51] Int. Cl.$^6$ .................................................. B60B 7/06
[52] U.S. Cl. ................................... 301/37.43; 301/37.36
[58] Field of Search .............................. 301/37.1, 37.35, 301/37.36, 37.39, 37.41; 29/894.38, 894.381

[56] References Cited

U.S. PATENT DOCUMENTS

| | | | |
|---|---|---|---|
| 1,457,396 | 6/1923 | Reuse | 301/37.28 X |
| 1,858,228 | 5/1932 | Lyon . | |
| 2,226,511 | 12/1940 | Hollerith . | |
| 2,304,581 | 12/1942 | Lyon | 29/894.381 X |
| 2,898,149 | 8/1959 | Lyon . | |
| 3,029,909 | 4/1962 | Thomas . | |
| 3,570,093 | 3/1971 | Gollwitzer | 29/894.38 |
| 3,669,501 | 6/1972 | Derleth . | |
| 3,726,566 | 4/1973 | Beith | 301/37.1 |
| 3,823,982 | 7/1974 | Spisak . | |
| 3,860,295 | 1/1975 | Beisch . | |
| 3,891,276 | 6/1975 | Spisak . | |
| 3,915,502 | 10/1975 | Connell . | |
| 4,316,637 | 2/1982 | Reynolds et al. | 301/37.1 |
| 4,398,770 | 8/1983 | Smith . | |
| 4,416,926 | 11/1983 | Maglio . | |
| 4,530,542 | 7/1985 | Spiegel et al. . | |
| 5,031,966 | 7/1991 | Oakey . | |
| 5,316,376 | 5/1994 | Defreitas . | |
| 5,368,370 | 11/1994 | Beam . | |
| 5,458,401 | 10/1995 | Baccman . | |

FOREIGN PATENT DOCUMENTS

| | | | |
|---|---|---|---|
| 219983 | 1/1959 | Australia | 301/37.36 |
| 1355663 | 2/1964 | France . | |
| 2813412 | 10/1979 | Germany . | |
| 0119624 | 9/1984 | Germany . | |
| 8614301 | 7/1986 | Germany . | |
| 3741113 | 6/1989 | Germany | 301/37.36 |
| 4321057 | 1/1994 | Germany . | |
| 4012902 | 1/1989 | Japan | 301/37.36 |

*Primary Examiner*—Russell D. Stormer
*Attorney, Agent, or Firm*—MacMillan, Sobanski & Todd

[57] ABSTRACT

An improved vehicle wheel cover retention system and method for producing the same includes a vehicle wheel having a disc defining an outboard facing wheel surface and including an outboard tire bead seat retaining flange. The outboard bead seat retaining flange includes an outer peripheral end and an inner surface having a circumferential, radially outwardly facing groove formed therein. The vehicle wheel further includes a wheel cover which covers at least a portion of the outboard facing wheel surface and the entire portion of the outer peripheral end of the outboard bead seat retaining flange. The wheel cover includes an inner cover surface and an outer annular lip which extends into the groove when the wheel cover is installed on the disc. The method for producing the vehicle wheel includes the steps of: (a) providing a vehicle wheel including a disc defining an outboard facing wheel surface and including an outboard tire bead seat retaining flange, the outboard bead seat retaining flange including an outer peripheral end and an inner surface having a circumferential, radially outwardly facing groove formed therein; (b) providing a wheel cover defining an inner cover surface and an outer cover surface, the wheel cover including an outer annular lip; (c) applying an adhesive to one of the outboard facing wheel surface and the inner cover surface; (d) supporting the wheel and the cover in coaxial relationship relative to one another; (e) selectively moving the wheel and the cover toward one another to enable the adhesive to secure the wheel and the cover together; and (f) subjecting the outer annular lip of the wheel cover to an operation to deform the outer annular lip and cause the outer annular lip to be received into the groove whereby the wheel cover covers at least a portion of the outboard facing wheel surface and the entire portion of the outer peripheral end of the outboard bead seat retaining flange.

10 Claims, 5 Drawing Sheets

FIG. 3

VEHICLE WHEEL COVER RETENTION SYSTEM AND METHOD FOR PRODUCING SAME

CROSS REFERENCE TO RELATED APPLICATIONS

This application is a continuation-in-part of U.S. Ser. No. 8/389,867, filed Feb. 23, 1995, which is a continuation-in-part of U.S. Ser. No. 08/203,058, filed Feb. 28, 1994, now U.S. Pat. No. 5,435,631.

BACKGROUND OF THE INVENTION

This invention relates in general to vehicle wheels and, in particular, to an improved vehicle wheel cover retention system and method for producing the same.

Full or partial vehicle wheel covers of the removable type are well known, and have been used for many years to enhance the styling of conventional, stamped wheel discs. Also, it is known to permanently secure a full or partial wheel cover to a vehicle wheel using an adhesive.

One example of a vehicle wheel with a permanently secured wheel cover is disclosed in German Patent 2,813,412. In the German Patent, the edges of the wheel cover are profiled to be clamped or hooked into fitting grooves provided on the outboard face of the wheel to secure the cover to the wheel. Additionally, the cover can also be glue-joined to the wheel.

Another example of a vehicle wheel having a permanently secured wheel cover is disclosed in U.S. Pat. No. 3,669,501 to Derleth. In the Derleth patent, a chrome-plated plastic wheel cover includes an outer peripheral flange which overhangs the outboard tire bead seat retaining flange of the wheel, an inner peripheral flange which seats against an outboard surface of a hub sleeve, and an intermediate portion which is spaced outwardly from the face of the wheel. An expanding adhesive material is applied to me outboard surfaces of the wheel. When the adhesive material is expanded, it is operative to fill the void between the wheel and the wheel cover to permanently secure the wheel cover to the outboard face of the wheel.

A further example of a vehicle wheel having a permanently secured wheel cover is disclosed in U.S. Pat. No. 5,031,966 to Oakey. In the Oakey patent, a cast aluminum wheel cover is secured to a disc of a steel wheel using a high density structural adhesive.

A yet further example of a vehicle wheel having a permanently secured wheel cover is disclosed in U.S. Pat. No. 5,368,370 to Beam. In the Beam patent, a chrome-plated stainless steel wheel cover includes an outer peripheral edge which is forced into engagement behind a catch formed in the outer rim flange to hold the wheel cover in place while an adhesive cures.

SUMMARY OF THE INVENTION

This invention relates to an improved vehicle wheel cover retention system and method for producing the same. In particular, the vehicle wheel includes a disc defining an outboard facing wheel surface and including an outboard tire bead seat retaining flange. The outboard bead seat retaining flange includes an outer peripheral end and an inner surface having a circumferential, radially outwardly facing groove formed therein. The vehicle wheel further includes a wheel cover which covers at least a portion of the outboard facing wheel surface and the entire portion of the outer peripheral end of the outboard bead seat retaining flange. The wheel cover includes an inner cover surface and an outer annular lip which extends into the groove when the wheel cover is installed on the disc. Preferably, an adhesive is applied to one of the outboard facing wheel surface and the inner cover surface to permanently secure the wheel cover and the disc together.

The method for producing the vehicle wheel includes the steps of: (a) providing a vehicle wheel including a disc defining an outboard facing wheel surface and including an outboard tire bead seat retaining flange, the outboard bead seat retaining flange including an outer peripheral end and an inner surface having a circumferential, radially outwardly facing groove formed therein; (b) providing a wheel cover defining an inner cover surface and an outer cover surface, the wheel cover including an outer annular lip: (c) applying an adhesive to one of the outboard facing wheel surface and the inner cover surface; (d) supporting the wheel and the cover in coaxial relationship relative to one another; (e) selectively moving the wheel and the cover toward one another to enable the adhesive to secure the wheel and the cover together; and (f) subjecting the outer annular lip of the wheel cover to an operation to deform the outer annular lip and cause the outer annular lip to be received into the groove whereby the wheel cover covers at least a portion of the outboard facing wheel surface and the entire portion of the outer peripheral end of the outboard bead seat retaining flange.

Other advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
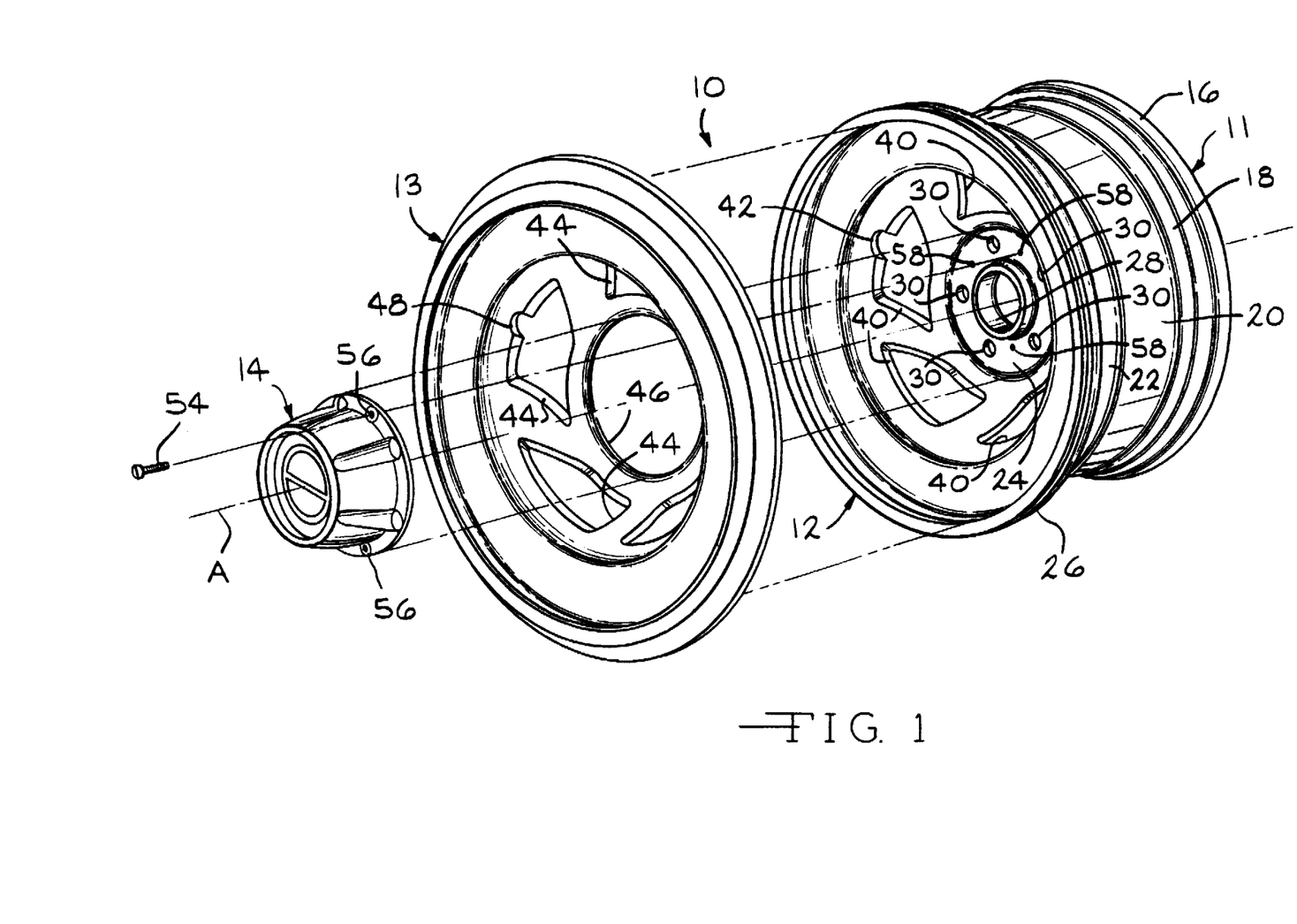
FIG. 1 is an exploded perspective view of an improved vehicle wheel constructed in accordance with the present invention.

Referring now to the drawings, there is illustrated in FIG. 1 an exploded perspective view of an improved vehicle wheel, indicated generally at 10, in accordance with the present invention. The vehicle wheel 10 shown in this embodiment is a full face fabricated type of wheel, and includes a rim 11, a full face wheel disc 12, a wheel cover 13, and a cap 14. Although this invention is discussed in conjunction with the particular wheel disclosed herein, it will be appreciated that the invention may be used in conjunction with other types of wheel constructions. For example, the wheel can be a "bead seat attached" wheel (such as shown in FIG. 4 of U.S. Pat. No. 5, 188,429 to Heck et al.), a "well attached" wheel (such as shown in FIG. 3 of Heck et al.), a "bimetal" wheel construction including an aluminum disc and a steel rim (such as shown in U.S. Pat. No. 5,421,642 to Wei et al.), or a "modular wheel" construction including a "partial" rim and a full face wheel disc (such as shown in U.S. Pat. No. 5,360,261 to Archibald et al.), all of these patents incorporated herein by reference.

The rim 11 is a fabricated rim constructed of steel, aluminum, or other suitable alloy materials. The rim 11 includes an inboard tire bead seat retaining flange 16, an inboard tire bead seat 18, a generally axially extending well 20, and an outboard tire bead seat 22. The rim 11 further includes an opening (not shown) formed therein to accommodate a valve stem (not shown).

The disc 12 is forged, cast, fabricated, or otherwise formed, and is constructed of steel, aluminum, or other suitable alloy materials. The disc 12 includes a generally centrally located wheel mounting surface 24, and an outer annular portion 26. The wheel mounting surface 24 is provided with a centrally located pilot aperture 28, and a plurality of lug bolt receiving holes 30. The lug bolt receiving holes 30 receive lug bolts (not shown) for securing the wheel 10 on a vehicle axle (not shown).

Figure 2:
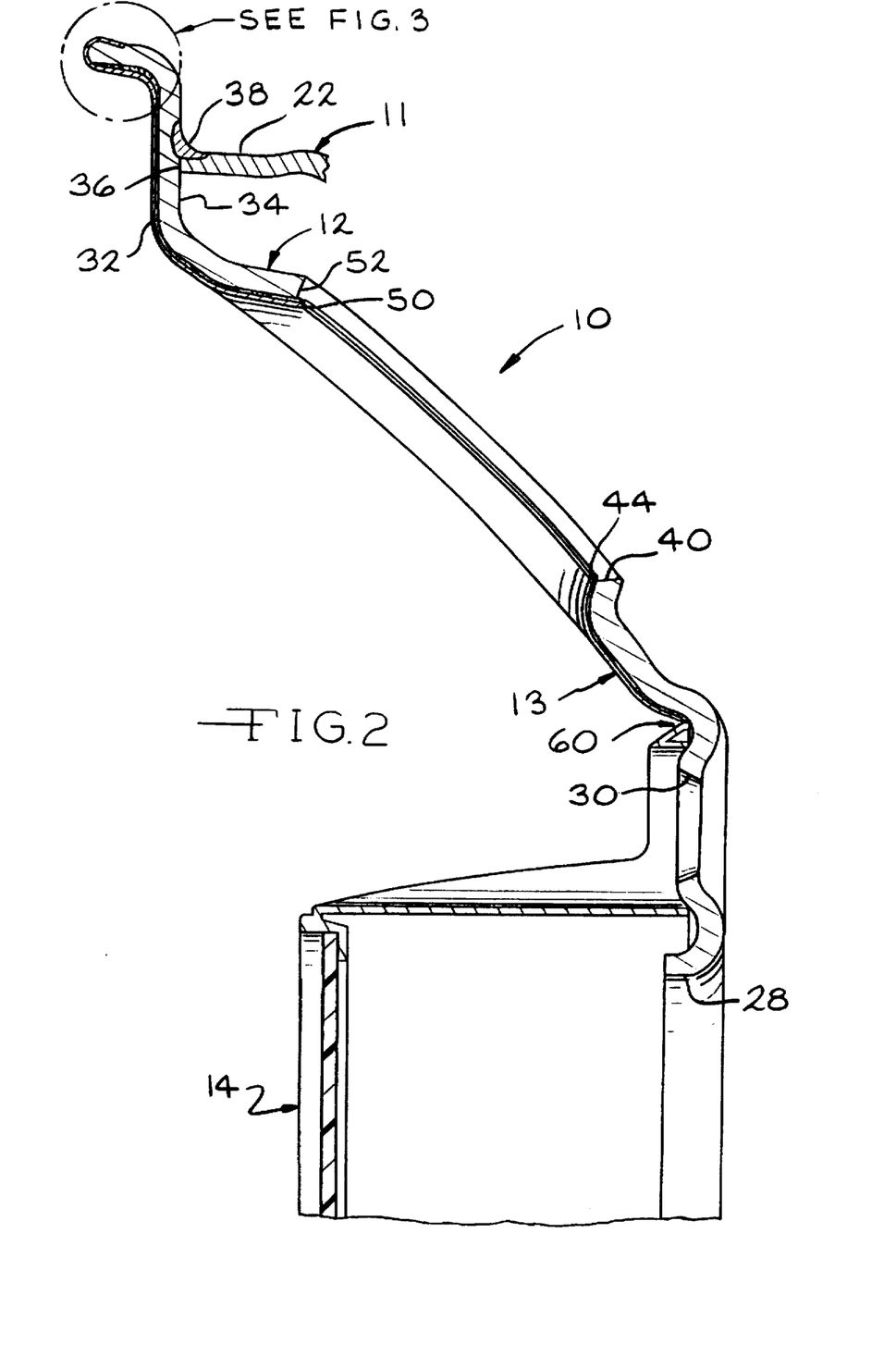
FIG. 2 is a sectional view of a selected portion of the vehicle wheel illustrated in FIG. 1.

The outer annular portion 26 or,he disc 12 defines an outboard tire bead seat retaining flange of the wheel 10, and includes an outer surface 32 and an inner surface 34, shown in FIG. 2. To assemble the wheel 10, an outboard end 36 of the rim 11 is positioned against the inner surface 34 of the disc 12, and a weld 38 is provided to join the disc 12 and rim 11 together as shown in FIG. 2. The disc 12 further included a plurality of decorative windows 40 (five windows 40 being illustrated). As shown in this embodiment, one of the windows 40 includes a cut-out portion 42 (shown in FIG. 1), to accommodate the valve stem.

The wheel cover 13 shown in this embodiment is preferably formed from stainless steel having a thickness of approximately 0.020 inch, and is painted or chrome-plated. The wheel cover 13 is prefabricated to generally match the particular configuration of the outboard facing surface of the disc 12. In particular, the wheel cover 13 includes a plurality of openings 44 which correspond to the windows 40 formed in the disc 12, and an enlarged central opening 46. One of the openings 44 includes a cut-out portion 48 which generally corresponds to the cut-out 42 provided in the one window 40 to accommodate the valve stem.

The openings 44 in the wheel cover 13 are preferably formed by a stamping operation. Also, as best shown in FIG. 2, edges 50 of the wheel cover openings 44 preferably extend slightly past edges 52 of the windows 40 to effectively overlap the edges 52 of the windows 40. As a result of this, when a to wheel cover 13 which has been chrome-plated is joined to the disc 12, the completely assembled wheel 10 of the present invention has the appearance of a "chrome-plated" wheel.

As shown in this embodiment, the cap 14 is secured to the disc 12 by a plurality of fasteners 54 (only one fastener 54 being illustrated). The fasteners 54 extend through openings 56 formed in the cap 14, and are received in threaded inserts 58 which are secured in openings provided in the wheel mounting surface 24 of the disc 12. The inner edge of the wheel cover 13 can either be located outside the edge of the cap 14 (as shown in FIG. 2 at 60), or, alternatively, can extend radially inwardly under the cap 14 (not shown).

Figure 3:
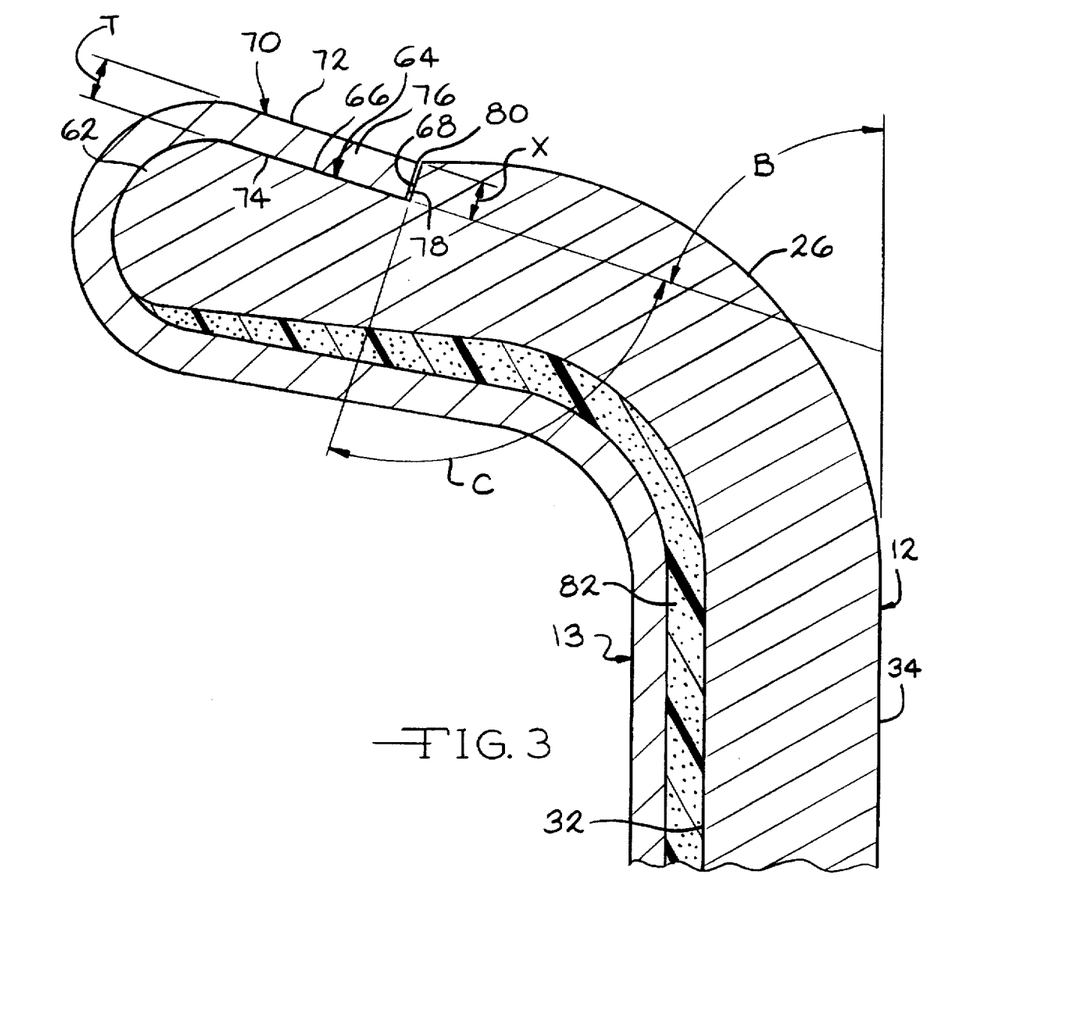
FIG. 3 is an enlarged sectional view of a selected portion of the vehicle wheel illustrated in FIG. 2.

As shown in FIG. 3, the outboard tire bead seat retaining flange 26 of the disc 12 includes a smooth, rounded outer peripheral end 62, and a circumferential, radially outwardly facing groove or recess 64. Preferably, the peripheral end 62 and the groove 64 are formed by a machining operation to predetermined specifications. However, the peripheral end 62 and/or the groove 64 can be formed by other methods. For example, the peripheral end 62 and/or the groove 64 can be formed by a stamping operation or a spinning operation.

The groove 64 is formed in the inner surface 34 of the outboard tire bead seat retaining flange 26, and is defined by a first surface 66 which extends in a generally axial direction, and a second surface 68 which extends in a generally radial direction a predetermined distance X. In particular, the surfaces 66 and 68 are oriented at predetermined angles B and C, respectively, relative to a reference line Y which is defined by the inner surface 34 of the disc 12 and is generally perpendicular to the wheel axis A. The angle B is in the range of 60° to 80°, and the angle B is in the range of 60° to 120°. Preferably, as illustrated in this embodiment, the angle B is approximately 72°, and the angle C is approximately 90°. As will be discussed below, the distance X is selected to that an outer end, indicated generally at 70, of the wheel cover 13 is preferably completely recessed within the groove 64.

The outer end 70 of the wheel cover 13 defines an outer surface 72, an inner surface 74, and an outer annular lip 76. The outer annular lip 76 defines an outer peripheral edge 78. As shown in this embodiment, the inner surface 74 of the wheel cover 16 contacts the adjacent first surface 66 of the groove 64, and the outer peripheral edge 78 of the wheel cover 13 is spaced from the adjacent second surface 68 of the groove 64; however, in some instances, depending upon the uniformity of the outer peripheral edge 70 dimension of the wheel cover 13, there may be some contact (not shown) between the outer peripheral edge 76 and the second surface 68 to accommodate small dimensional changes in the outer peripheral edge 78 of the wheel cover 13. The outer peripheral edge 78 of the wheel cover 13 defines an outer circle 80.

In order to permanently secure the wheel cover 13 to the disc 12, an adhesive 82, such as a two-part epoxy, is utilized. A suitable two-pan epoxy is FUSOR 380/383 manufactured by Lord Corporation. The adhesive 82 is preferably applied on the outboard face of the disc 12 in a predetermined pattern so that when the wheel cover 13 is installed on the disc 12, a smearing of the adhesive 82 over substantially the entire outboard face of the disc 12 occurs. The adhesive 82 functions to permanently secure the wheel cover 13 to the disc 12. Also, since the adhesive 82 covers substantially the entire interface between the wheel cover 13 and the disc 12, it is effective to provide a seal and prevent water, mud, salt and other debris from entering between the wheel cover 13 and the outboard facing surface of the disc 12.

The distance X of the second surface 76 of the groove 64 is at least equal to a thickness T of the wheel cover 13 so that the outer circle 80 of the wheel cover 13 is recessed relative to the inner surface 34 of the outboard tire bead seat retaining flange 26 of the disc 12. This effectively hides the outer peripheral edge 78 of the wheel cover 13. Preferably, the distance X is greater than the thickness T of the wheel cover 13 to accommodate the natural spring back of the end of the wheel cover 13. For example, if the wheel cover 13 has a thickness of approximately 0.020 inch, the distance X is approximately 0.030 inch. Also, the end of the wheel cover 13 is preferably sized to ensure that an end of a wheel balance weight (not shown) is frictionally retained on the surface 72 of the wheel cover 13 and not on the tire bead seat retaining flange 26 of the wheel 10.

Figures 4, 5, 6:
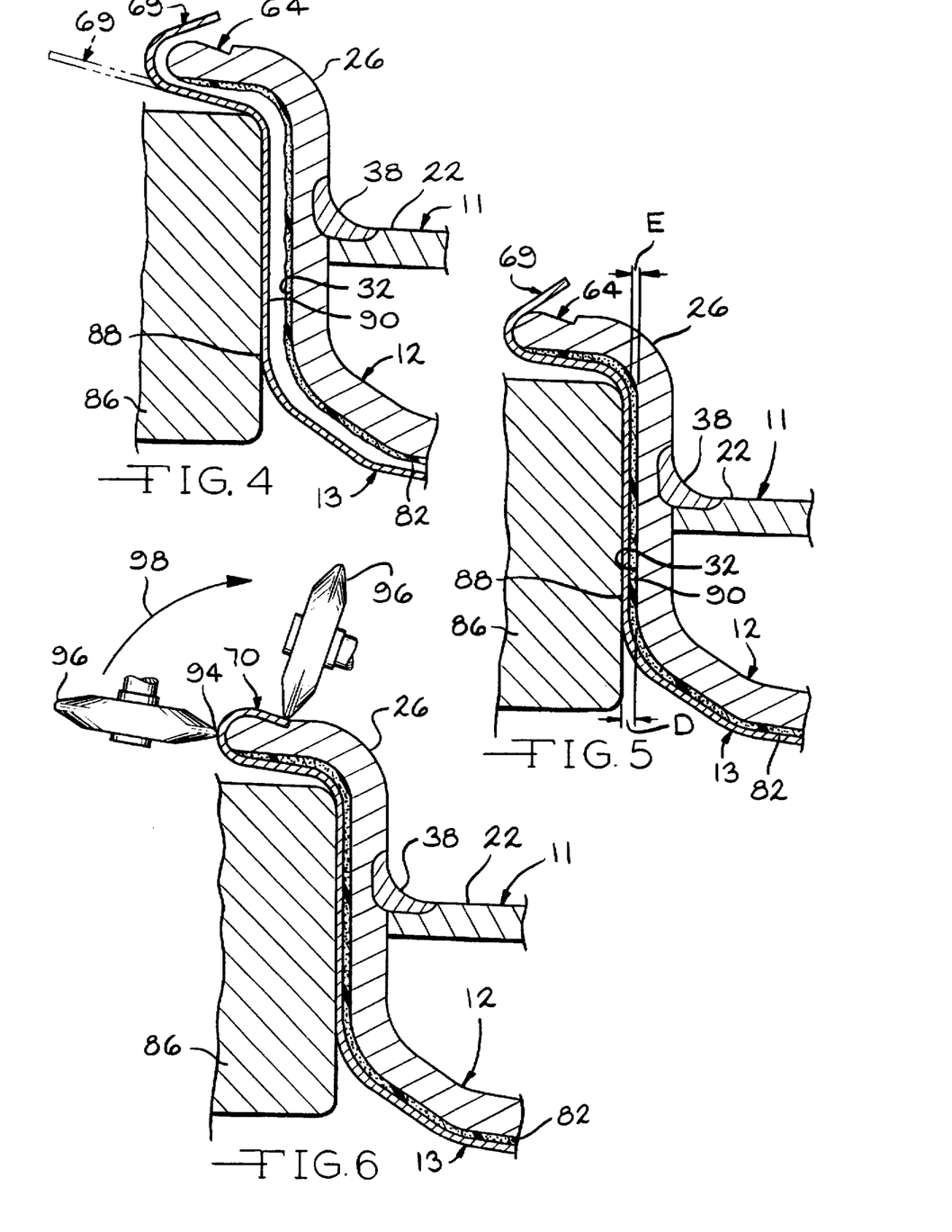
FIG. 4 is an enlarged sectional view of a selected portion of the vehicle wheel illustrated in FIG. 2, and showing the initial installation operation of the wheel cover.
FIG. 5 is an enlarged sectional view showing an intermediate installation operation of the wheel cover illustrated in FIG. 4.
FIG. 6 is an enlarged sectional view showing the final installation operation of the wheel cover illustrated in FIG. 4.

Referring now to FIGS. 4 through 6, there is illustrated a sequence of operations for producing the vehicle 10 in accordance with this invention. Initially, as shown in FIG. 4, the wheel cover 13 is positioned adjacent the outer surface 32 of the disc 12 with a tool 86 positioned adjacent a portion of an outer surface 88 of the wheel cover 13. In this embodiment, the adhesive 82 is preferably applied to the outer surface 32 of the disc 12. Alternatively, the adhesive 82 can be applied to an inner surface 90 of the wheel cover 13 (not shown).

As shown in FIG. 4, the wheel cover 13 is prefabricated in such a manner so as to generally correspond to the profile of the outer surface 32 of the disc 12. In particular, in the illustrated embodiment, the wheel cover 13 includes an outer end, indicated generally at 69, having a generally U-shaped configuration which generally corresponds to the configuration of the outer peripheral end 62 of the disc 12. Alternatively, as shown in phantom in FIG. 4, the outer end 69 of the wheel cover 13 can extend radially outwardly.

Next, as shown in FIG. 5, the tool 86 is moved axially toward the disc 12 and presses the wheel cover 13 against the disc 12 in a predetermined position. In particular, the tool 86 is effective to space the inner surface 90 of the wheel cover 13 a predetermined distance A from the outer surface 32 of the disc 12 such that there is a sufficient thickness of adhesive 80 at the interface between the disc 12 and the wheel cover 13. The distance D is generally equal to the sum of the thickness T of the wheel cover 12 and a desired adhesive 80 thickness denoted in FIG. 5 as E.

Following this, the outer end 69 of the wheel cover 13 is subjected to a flow spinning operation. During the flow spinning operation, an outer surface of the outer end 69 of the wheel cover 13 is engaged by a tool end 94 of a spinning tool 96. The spinning tool 96 is mounted on a support member (not shown) which allows the spinning tool 96 to generally travel parallel to the profile of the outer peripheral end 62 of the disc 12. As shown in this embodiment, the spinning tool 96 is advanced in the direction of the arrow 98 to deform the outer end 69 of the wheel cover 13 and produce the finished vehicle wheel 10. In the illustrated embodiment, since the wheel cover 13 is formed from a relatively strong material, this movement does not cause a thinning of the thickness of the wheel cover 13 but only is effective to deform the outer end 69 of the wheel cover 13 and cause the finish formed outer end 70 to seat into the groove 64. Alternatively, the flow spinning operation can cause some thinning of the outer end 70 of the wheel cover 13, especially if the wheel cover 13 is constructed of some other materials, such as for example, aluminum.

Figure 7:
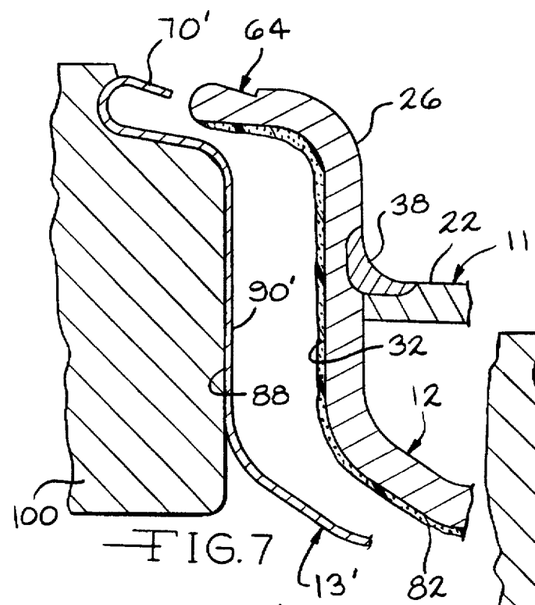
FIG. 7 is a view similar to FIG. 4, and showing an alternate embodiment of a wheel cover and the initial installation operation of the wheel cover.
Figure 8:
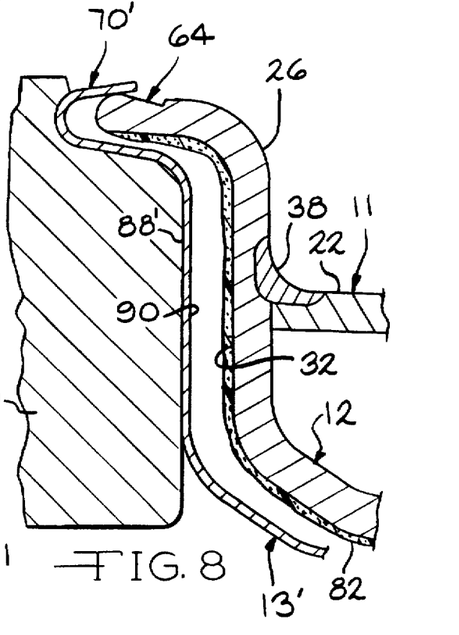
FIG. 8 is an enlarged sectional view showing an intermediate installation operation of the wheel cover illustrated in FIG. 7.
Figure 9:
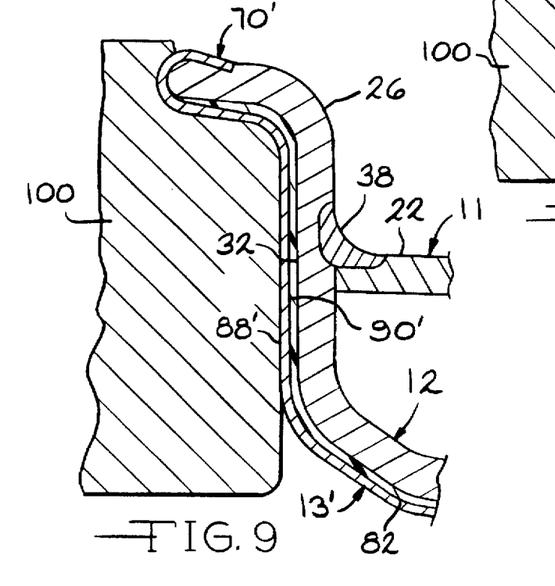
FIG. 9 is an enlarged sectional view showing the final installation operation of the wheel cover illustrated in FIG. 7.

Turning now to FIGS. 7 through 9 and using like reference numbers to for corresponding parts, there is illustrated an alternate embodiment of a wheel cover, indicated generally at 13' and a sequence of operations for installing the wheel cover 13' in the groove 64' to produce the vehicle 10.

As shown in FIG. 7, the wheel cover 13' is identical to the wheel cover 13 except that the wheel cover 13' is prefabricated in such a manner so as to generally resemble the particular configuration of the outboard facing surface of the disc 12, including the outer end 62 thereof. In particular, the wheel cover 13' includes a prefabricated generally U-shaped outer end 70' which generally matches the profile of the peripheral end 62 of the disc 12.

To install the wheel cover 13', initially, as shown in FIG. 7, the wheel cover 13' is positioned adjacent the outer surface 32 of the disc 14 with a tool 100 positioned adjacent a portion of an outer surface 88' of the wheel cover 13'. As shown in this embodiment, the adhesive 82 is preferably applied to the outer surface 32 of the disc 12. Alternatively, the adhesive 82 can be applied to an inner surface 90 of the wheel cover 13' (not shown).

Next, as shown in FIG. 8, the tool 100 is moved axially toward the disc 12 to bias the outer end 70' of the wheel cover 13' against the adjacent surface of the peripheral end 62 of the disc 12 and force open the outer end 70' of the wheel cover 13'. The tool 100 is further moved axially toward the disc 12 so as to space the inner surface 90' of the wheel cover 13' a predetermined distance D' from the outer surface 32 of the disc 12 such that there is a sufficient thickness of adhesive 80 at the interface between the disc 12 and the wheel cover 13', as shown in FIG. 9. At the same time, the outer end 70' of the wheel cover 13' springs back to its prefabricated profile and is received in the groove 64.

In accordance with the provisions of the patents statues, the principle and mode of operation of this invention have been described and illustrated in its preferred embodiment. However, it must be understood that the invention may be practiced otherwise than as specifically explained and illustrated without departing from the scope or spirit of the attached claims.

What is claimed is:

1. A vehicle wheel defining an axis and comprising:

a disc defining an outboard facing wheel surface and including an outboard tire bead seat retaining flange, tire bead seat retaining flange including an outer peripheral end and an inner surface having a circumferential, radially outwardly facing groove formed therein, and a wheel cover covering at least a portion of tire facing wheel surface and the entire portion of said outer peripheral end of said outboard bead seat retaining flange, said wheel cover including an outer annular lip which extends into said groove when said wheel cover is installed on said disc.

2. The wheel according to claim 1 wherein said outer annular lip is biased in said groove.

3. The wheel according to claim 1 wherein said groove is defined by a generally axially extending first surface and a second surface angled relative to said first surface.

4. The wheel according to claim 3 wherein said second surface is generally perpendicular to said first surface.

5. The wheel according to claim 3 wherein a portion of said outer peripheral edge is spaced apart from said second surface to define gap therebetween.

6. The wheel according to claim 3 wherein said second surface extends a predetermined distance, and said predetermined distance is greater than the thickness of said wheel cover.

7. The wheel according to claim 3 wherein said first surface is oriented between 60° to 80° relative to the wheel axis.

8. The wheel according to claim 3 wherein said second surface is oriented between 60° to 120° relative to the wheel axis.

9. The wheel according to claim 1 wherein said outer peripheral edge defines an inner circle, said outboard tire bead seat retaining flange defines a generally axially extending inner surface, and said inner circle is recessed relative to said inner side surface.

10. A method for producing a vehicle wheel comprising the steps of:
   (a) providing a vehicle wheel including a disc defining an outboard facing wheel surface and including an outboard tire bead seat retaining flange, the outboard tire bead seat retaining flange including an outer peripheral end and an inner surface having a circumferential, radially outwardly facing groove formed therein;
   (b) providing a wheel cover defining an inner cover surface and an outer cover surface, the wheel cover including an outer annular lip;
   (c) applying an adhesive to one of the outboard facing wheel surface and the inner cover surface;
   (d) supporting the wheel and the cover in coaxial relationship relative to one another;
   (e) selectively moving the wheel and the cover toward one another to enable the adhesive to secure the wheel and the cover together; and
   (f) subjecting the outer annular lip of the wheel cover to an operation to deform the outer annular lip and cause the outer annular lip to be received into the groove whereby the wheel cover covers at least a portion of the outboard facing wheel surface and the entire portion of the outer peripheral end of the outboard tire bead seat retaining flange.

* * * * *

UNITED STATES PATENT AND TRADEMARK OFFICE
CERTIFICATE OF CORRECTION

PATENT NO.  : 5,595,423
DATED       : January 21, 1997
INVENTOR(S) : Thomas E. Heck and Michael V. Maloney It is certified that error appears in the above-indentified patent and that said Letters Patent is hereby corrected as shown below:

Column 6, Claim 1, Line 4,   before "tire", insert -- said outboard --.

Column 6, Claim 1, Line 8,   before "facing", delete -- tire --.

Column 6, Claim 1, Line 8,   before "facing", insert -- said outboard --.

Column 6, Claim 1, Line 10,  before "bead", insert -- tire --.

Signed and Sealed this

Twenty-ninth Day of April, 1997

Attest:

BRUCE LEHMAN

Attesting Officer

Commissioner of Patents and Trademarks